United States Patent
Dallapiccola et al.

(10) Patent No.: US 11,760,003 B1
(45) Date of Patent: Sep. 19, 2023

(54) SYSTEMS AND METHODS FOR REINFORCING MULTI-LAYER STRUCTURES

(71) Applicant: DANA ITALIA S.R.L., Trentino (IT)

(72) Inventors: Matteo Dallapiccola, Trento (IT); Fabrizio Zendri, Rovereto (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 17/805,993

(22) Filed: Jun. 8, 2022

(51) Int. Cl.
*B29C 64/118* (2017.01)
*B29C 64/209* (2017.01)
*B29C 64/232* (2017.01)
*B33Y 10/00* (2015.01)
*B33Y 70/00* (2020.01)
*B29C 64/336* (2017.01)
*B29C 64/188* (2017.01)
*B29K 105/08* (2006.01)
*B29K 101/12* (2006.01)

(52) U.S. Cl.
CPC .......... *B29C 64/118* (2017.08); *B29C 64/188* (2017.08); *B29C 64/209* (2017.08); *B29C 64/232* (2017.08); *B29C 64/336* (2017.08); *B33Y 10/00* (2014.12); *B33Y 70/00* (2014.12); *B29K 2101/12* (2013.01); *B29K 2105/08* (2013.01)

(58) Field of Classification Search
CPC .................................................... B29C 64/118
See application file for complete search history.

(56) References Cited

U.S. PATENT DOCUMENTS

| | | | |
|---|---|---|---|
| 10,661,514 B2 * | 5/2020 | Talgorn | B29C 67/004 |
| 10,836,090 B2 | 11/2020 | Schmehl | |
| 10,899,071 B2 | 1/2021 | Page | |
| 10,906,234 B2 * | 2/2021 | Murao | B29C 64/209 |
| 11,548,211 B2 * | 1/2023 | Debora | B29C 64/106 |
| 2015/0210007 A1 | 7/2015 | Durand et al. | |
| 2015/0266244 A1 | 9/2015 | Page | |
| 2016/0067928 A1 | 3/2016 | Mark et al. | |
| 2016/0346999 A1 | 12/2016 | Patrov | |
| 2018/0141274 A1 | 5/2018 | Fink et al. | |
| 2018/0311891 A1 | 11/2018 | Duty et al. | |
| 2019/0091927 A1 * | 3/2019 | Kune | B29C 64/165 |
| 2020/0139624 A1 | 5/2020 | Khondoker et al. | |
| 2022/0219383 A1 * | 7/2022 | Kazmer | B29C 64/386 |
| 2023/0012165 A1 * | 1/2023 | Luo | B29C 64/245 |

FOREIGN PATENT DOCUMENTS

| | | | |
|---|---|---|---|
| EP | 3656535 A1 * | 5/2020 | |
| WO | WO-2016136166 A1 * | 9/2016 | B29C 67/0081 |
| WO | 2019093330 A1 | 5/2019 | |

* cited by examiner

*Primary Examiner* — Atul P. Khare
(74) *Attorney, Agent, or Firm* — McCoy Russell LLP

(57) ABSTRACT

The present disclosure relates to methods and systems for 3D printing. In one example, a 3D multi-layer structure is printed with a cavity distributed over multiple layers of a first filamentary material and shaped as a double-headed rivet. Further, the cavity is filled with a second filamentary material in a vertical direction to form a filament-based rivet, the vertical direction perpendicular to the plane of the multiple layers.

15 Claims, 12 Drawing Sheets

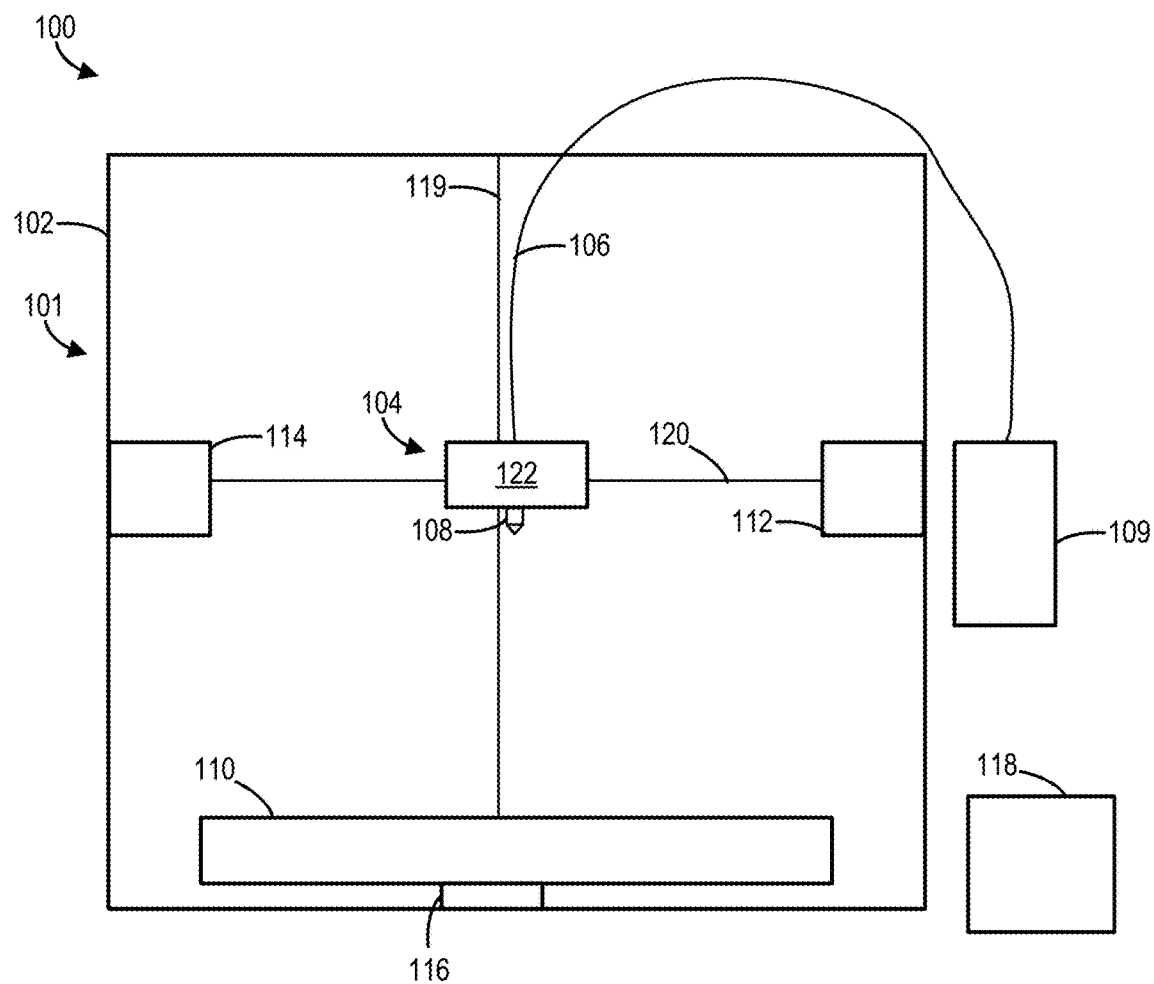
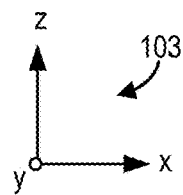
FIG. 1

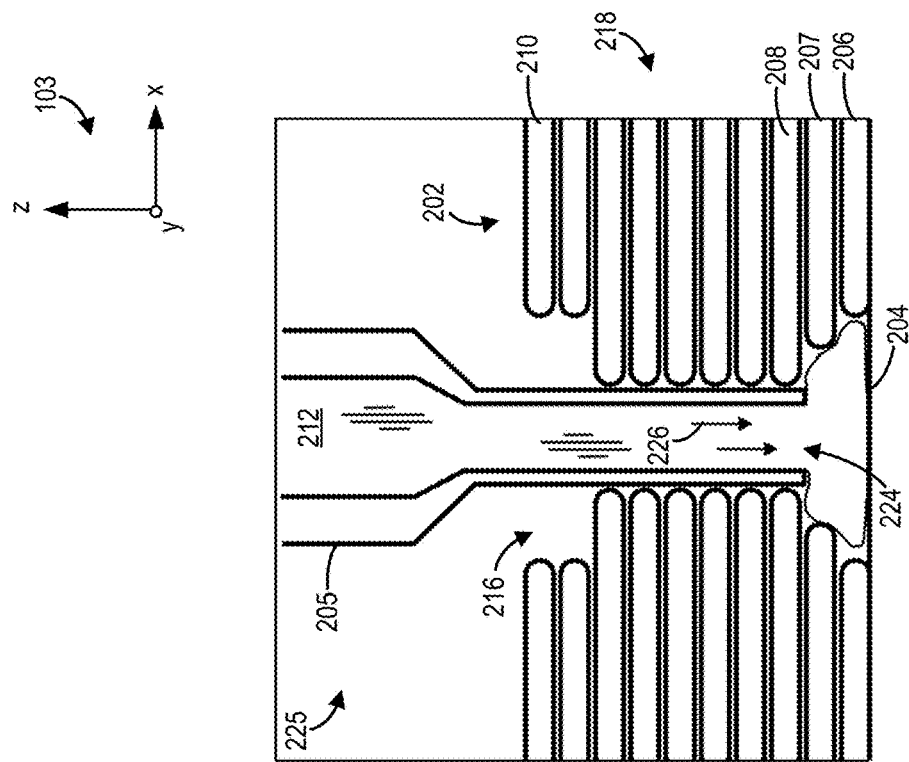
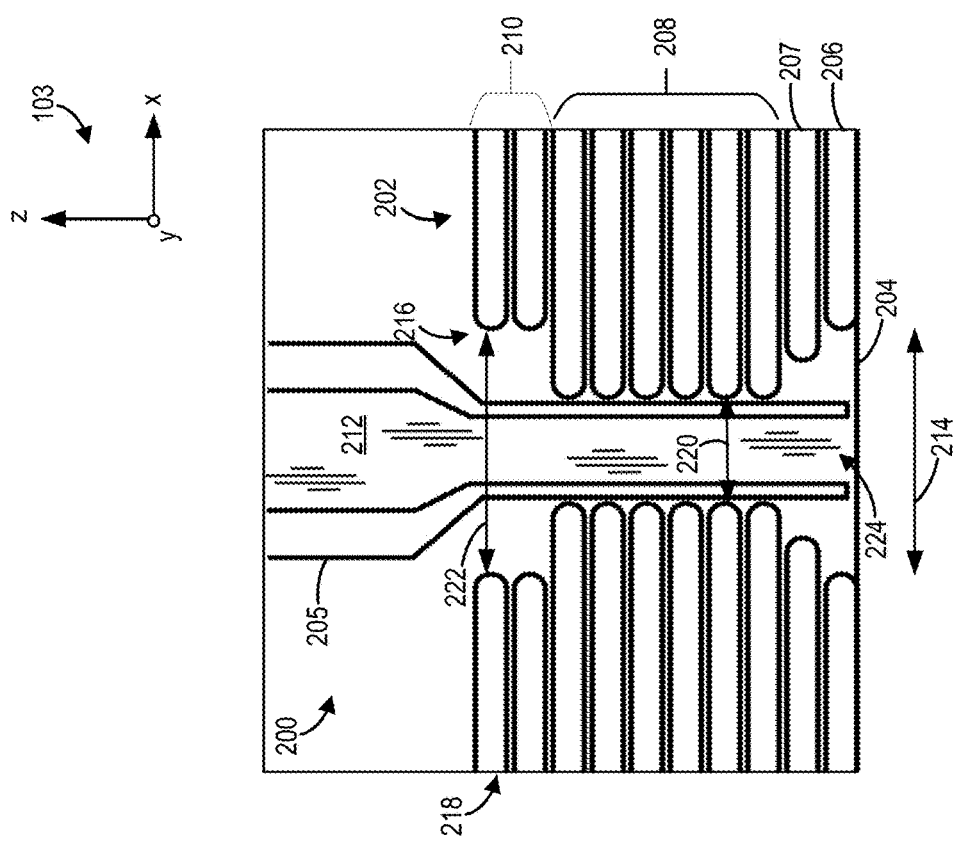

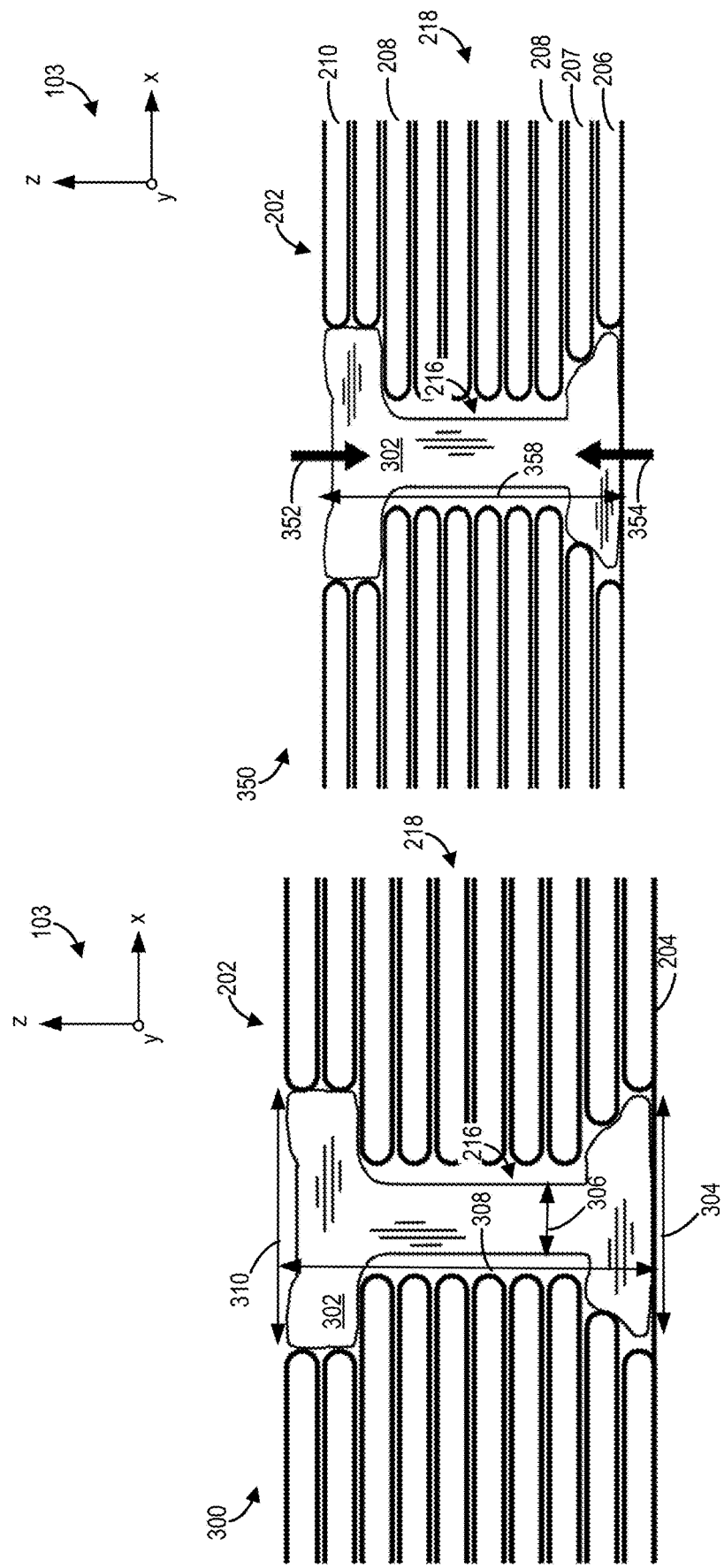

SYSTEMS AND METHODS FOR REINFORCING MULTI-LAYER STRUCTURES

TECHNICAL FIELD

The present description relates generally to methods and systems for three-dimensional (3D) printing of multi-layer structures.

BACKGROUND AND SUMMARY

Application of 3D printing, also referred to as additive manufacturing, allows for fabrication of 3D objects by successive addition of layers of material. Various 3D printing techniques are available, including fused deposition modeling (FDM), also known as fused filament modeling (FFM) wherein a thermoplastic material is extruded by a heated nozzle in successive layers. To increase a strength of 3D structures formed via FDM, continuous filament fabrication (CFF) may be used to reinforce the thermoplastic material. In CFF, a first nozzle extrudes the thermoplastic material and a second nozzle is used to overlay the extruded layer of the thermoplastic material with a continuous fiber, such as carbon or fiberglass. A resulting multi-layered structure may exhibit enhanced tensile strength due to a strategic positioning of the continuous fiber. However, the multi-layered structure may also demonstrate anisotropic mechanical properties. For example, a mechanical resistance (e.g., tensile strength) within a printed layer may be higher than a mechanical resistance between printed layers. As a result, adhesion between layers of the multi-layer structure may be comparatively low and the structure may be prone to delamination.

Attempts to address interlayer adhesion in 3D-printed multi-layered structures include use of connecting members between layers, either added separately (e.g., coupling layers via a bolt), or extruded. One example approach is shown by Page in U.S. Pat. No. 10,899,071. Therein, linking layers are formed via a tapered gap left in one or more sequential layers which may be linked to a subsequent layer by, when extruding the subsequent layer, pausing the extruder above the gap so that filament forming the subsequent layer also fills the gap that was left in the layers below. In this way, the subsequent layer is also partially in the previously formed layers, thus forming a linkage between the subsequent layer and the layers forming the gap.

However, the inventors herein have recognized potential issues with such systems. As one example, filling gaps using a standard extrusion nozzle may be difficult to realize in practice. An extruded filament may have a high surface tension and may not readily flow into a gap when extruded from a nozzle when the nozzle is raised to a height of a subsequent layer to be printed. Further, for practical reasons, a number of layers included in the height of the gap may be limited due the extent to which the extruded filament may flow to fill the gap before solidifying.

In one example, the issues above may be addressed by a method for printing a three-dimensional multi-layered structure, comprising distributing a cavity over multiple layers of a first filamentary material during deposition of the multiple layers of the first filamentary material, the cavity shaped as a double-headed rivet; and filling the cavity with a second filamentary material in a vertical direction to form a filament-based rivet, the vertical direction perpendicular to a plane of the multiple layers. In this way, adhesion between the layers of a multi-layer 3D printed structure may be increased during the 3D printing process and reducing a demand for additional post-processing steps. Further, an elongate nozzle may be used to fill the cavity, enabling the filamentary material to fill, and optionally entirely fill, the cavity more efficiently.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 1 shows a schematic illustration of a 3D printer which may be used to print a multi-layer structure.

FIGS. 2A-2D show a sequence of steps included in a process for reinforcing a multi-layer structure with at least one filament-based rivet.

FIG. 3A shows an example of a filament-based rivet formed in a multi-layer structure during 3D printing.

FIG. 3B shows the filament-based rivet of FIG. 3A after 3D printing is complete and the multi-layer structure is cooled.

DETAILED DESCRIPTION

Figure 4:
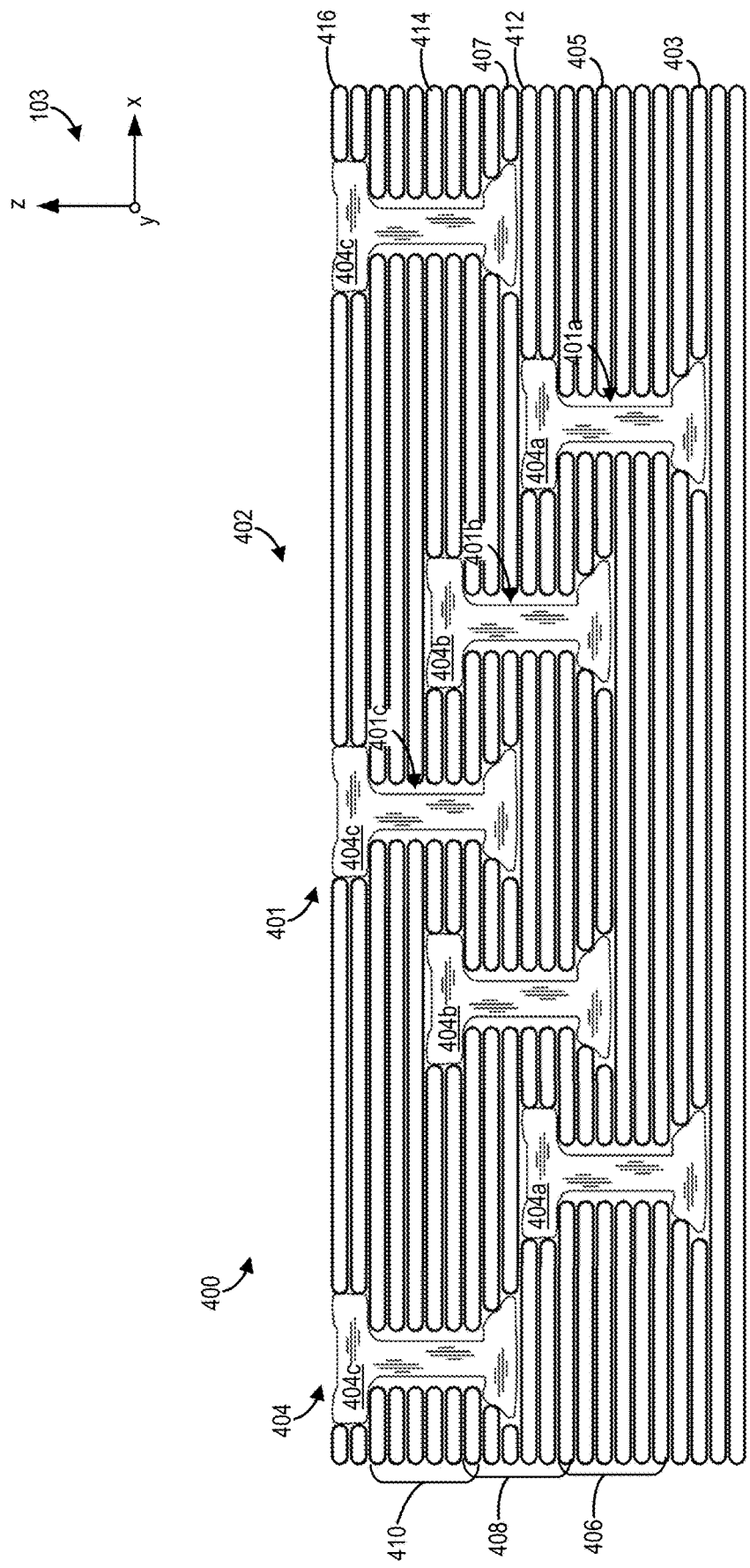
FIG. 4 shows an example of a multi-layered structure reinforced with multiple filament-based rivets.
Figure 6:
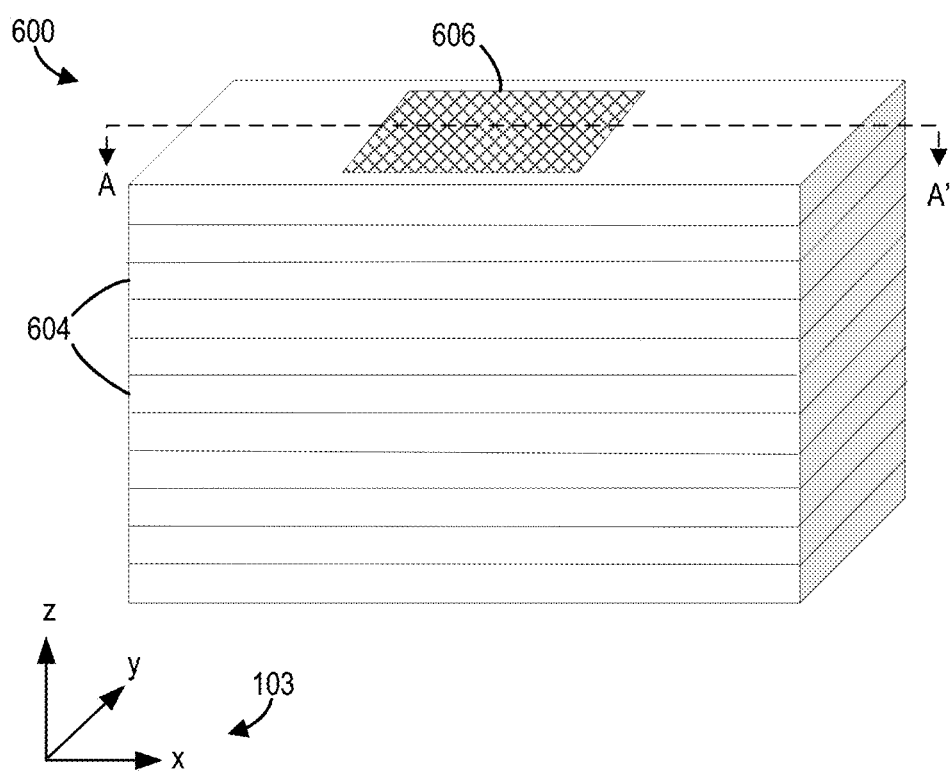
FIG. 6 shows an example of a 3D printed multi-layer structure including at least one filament-based rivet.
Figure 7:
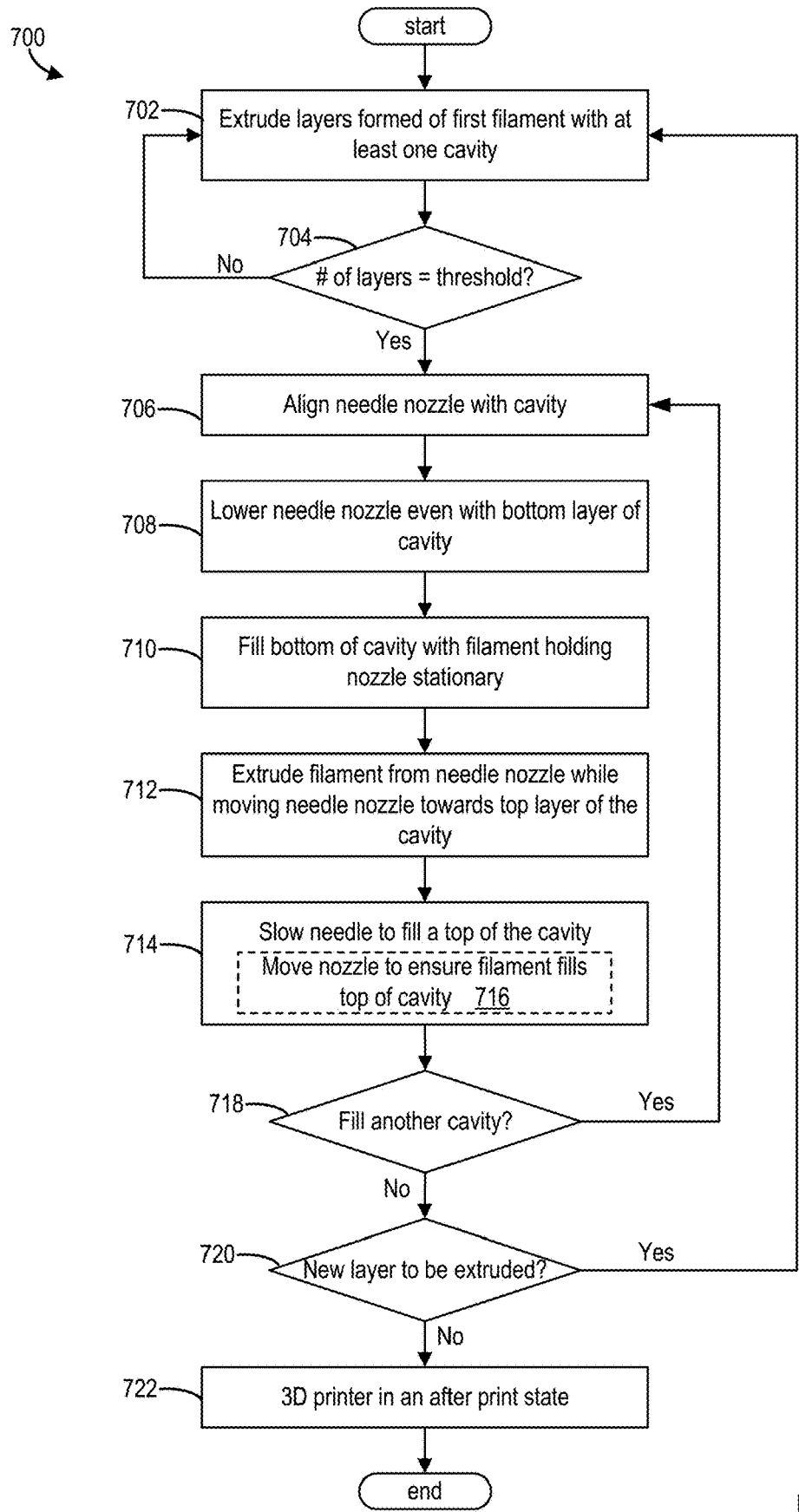
FIG. 7 shows a flow diagram of an example of a method for forming a multi-layer structure with multi filament-based rivets using a 3D printer with a needle extrusion nozzle.
Figure 8A:
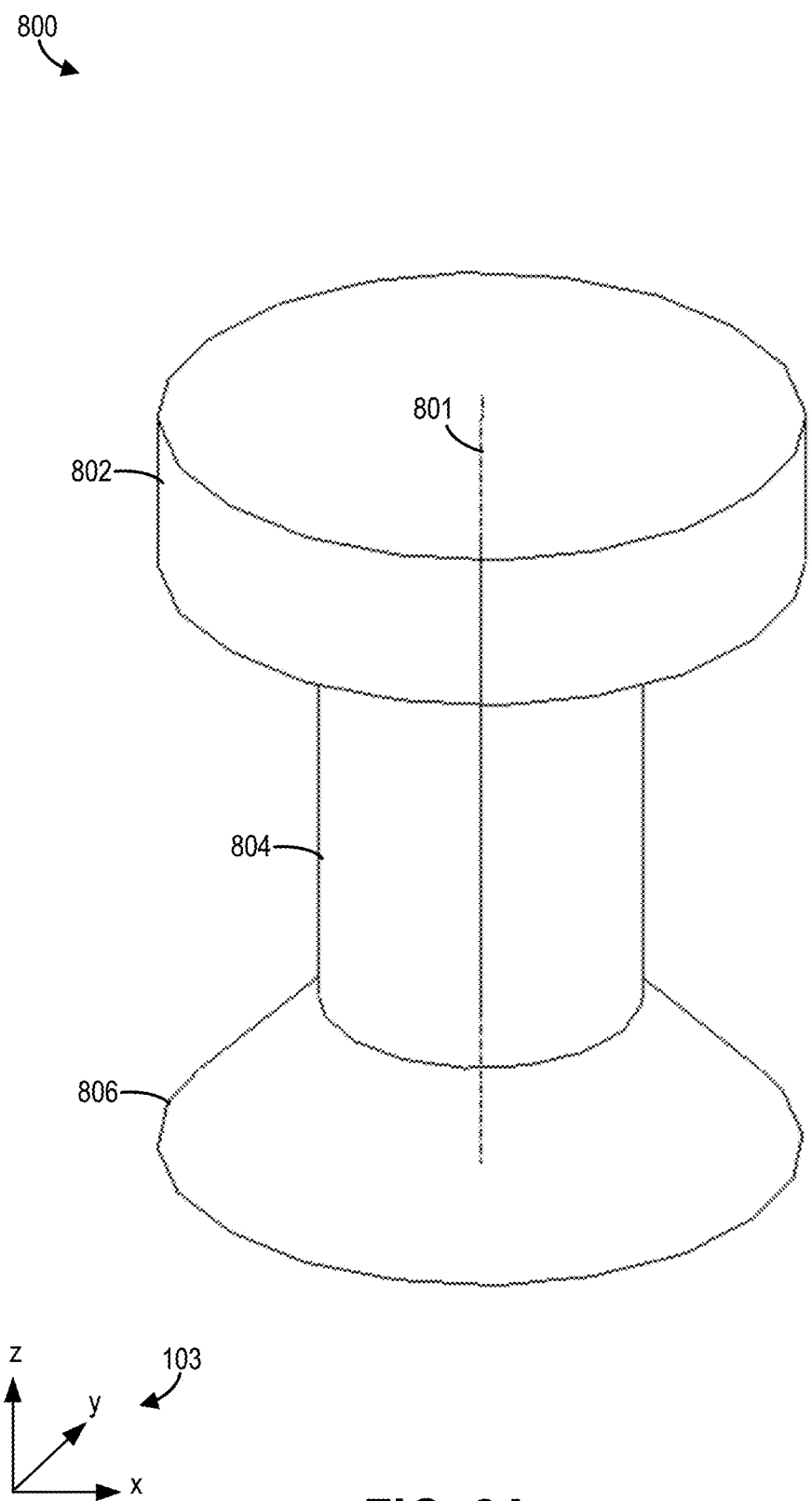
FIG. 8A shows an example of a circular filament-based rivet.
Figure 8B:
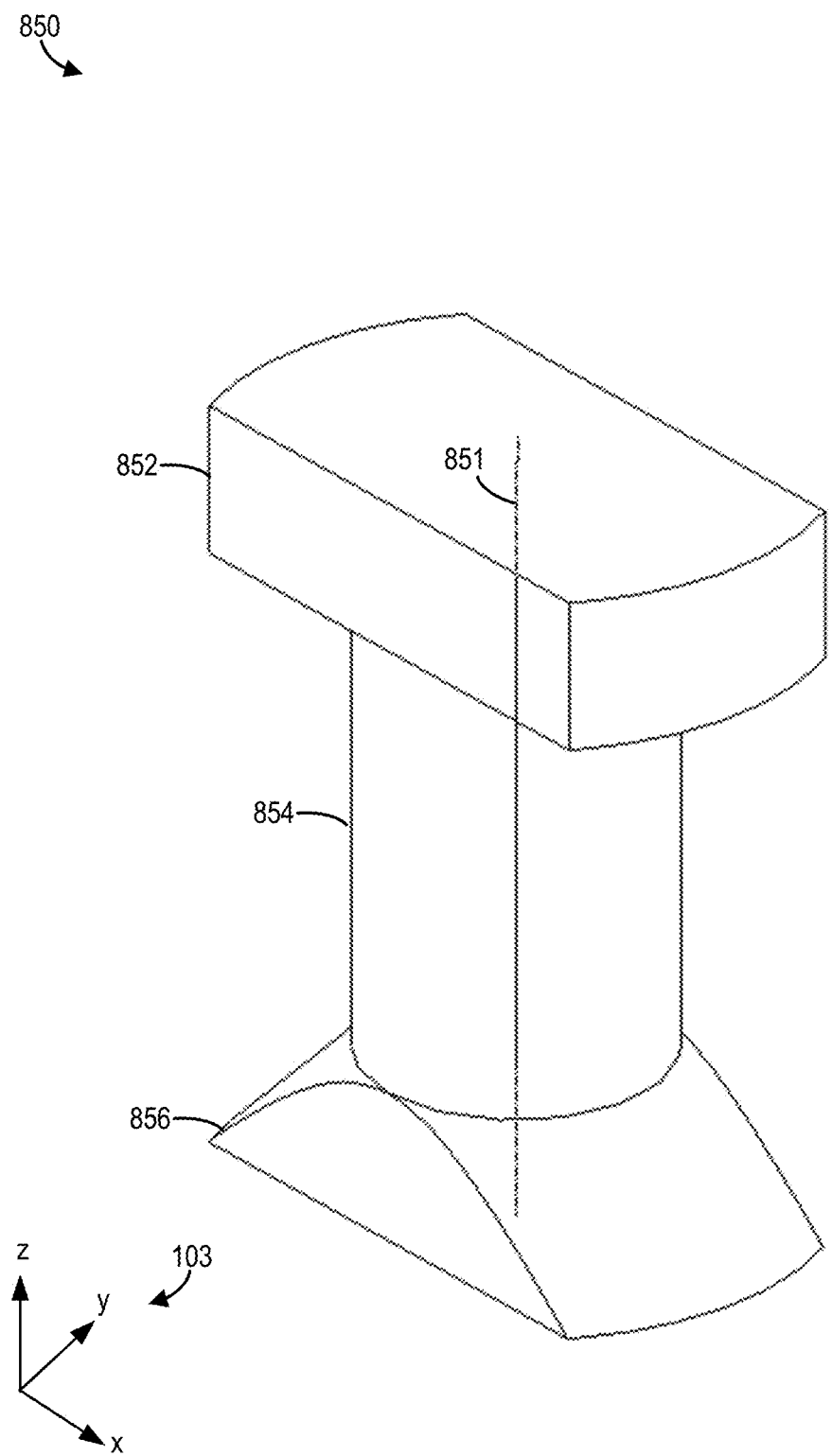
FIG. 8B shows an example of a rectangular filament-based rivet.
Figure 9:
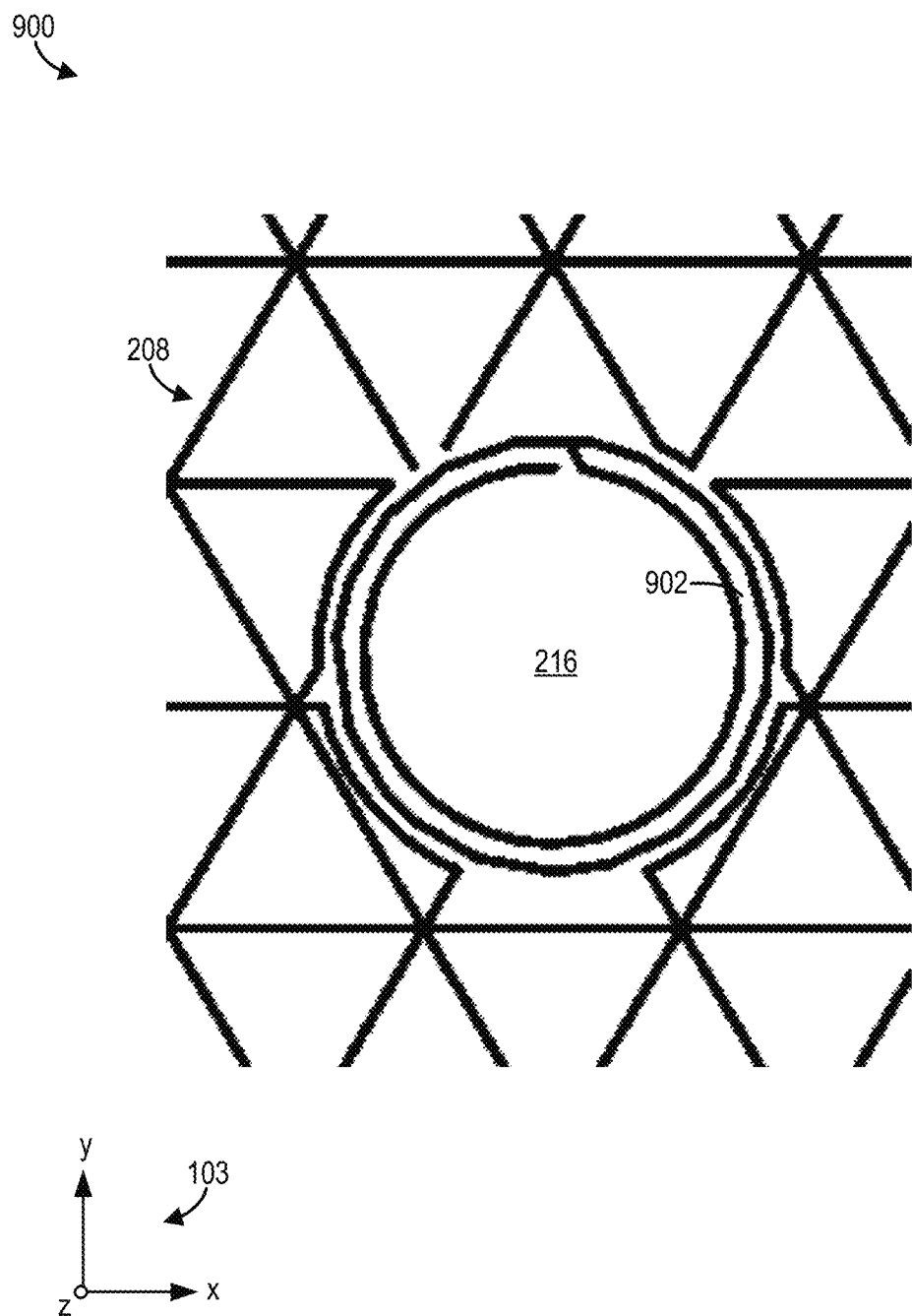
FIG. 9 shows an example of a top down view of a middle layer of a multi-layered structure.

The following disclosure relates to three-dimensional (3D) printing of multi-layer structures, as may be executed by a 3D printer schematically diagramed in FIG. 1. The 3D printer may construct a multi-layer structure by extruding a layer of material parallel to a bed via an extruder, as the extruder head moves along a first plane that is parallel to the bed. At a conclusion of a layer, a relative position of the extruder or bed may be adjusted so that a new layer may be formed on top of the previous layer. In this way, a height of the multi-layer structure increases with each subsequent layer, along a second plane perpendicular to the first plane. In order to increase a mechanical resistance of the multi-layer structure to interlayer separation, the multi-layer structure may be 3D-printed with one or more cavities into which a filament may be deposited to form filament-based rivets. Each of the cavities may extend across more than one layer of the multi-layer structure and may hereafter also be referred to as multi-layer filament cavities. Examples of the filament based rivet shown independent of the multi-layered structure and cavities are shown in FIGS. 8A-8B. FIG. 6 shows an example of a 3D printed multi-layer structure including at least one filament-based rivet. FIGS. 2A-2D show a sequence of steps included in the reinforcing of a multi-layer structure with at least one filament-based rivet. FIG. 9 shows an example of a top down view of the multi-layered structure which may be formed during the steps shown in FIGS. 2A-2D. The completed filament-based rivet is shown FIG. 3A and the cooled filament-based riven is shown in FIG. 3B. A single multi-layer 3D printed structure may include a plurality of filament-based rivets as shown in FIG. 4. A filament-based rivet may be formed using a needle extrusion nozzle which is illustrated in FIG. 5B and a conventional extrusion nozzle in FIG. 5A. The illustrations of FIGS. 2A-FIG. 4 show views of a 3D printed part in 2-dimensions along a z-x plane. A flow chart of a method for forming a multi-layer structure with at least one filament-based rivet is shown in FIG. 7.

Turning now to FIG. 1, a schematic diagram 100 of a 3D printer 101 is shown. The 3D printer 101 may be used for fused deposition modeling (FDM), as an example, to print a multi-layer structure. A set of reference axes 103 is provided, indicating an x-axis, a y-axis, and a z-axis. In one example, the z-axis may be parallel to a direction of gravity (vertical), and the x-y plane may also be referred to as a horizontal plane. However, other relative orientations are possible. The 3D printer 101 may include a frame 102, a bed 110, an x-motor 112, a y-motor 114, and a z-motor 116. Frame 102 may provide support for motors 112, 114, and 116. In some examples, x-motor 112 may move extruder 104 in a positive or negative x-direction via belt 120. Similarly, y-motor 114 may move extruder 104 in a positive or negative y-direction via a separate belt (not shown). Z-motor 116 may move bed 110 in a positive or negative z direction along guide 119. In this way, x-motor and y-motor may move extruder 104 along the horizontal plane to deposit a first layer of material along bed 110. Upon completion of deposition of the first layer, z-motor 116 may move bed 110 in a z-direction to position extruder 104 to deposit a second layer of material on top of the first layer of material.

Bed 110 may define a x-y plane onto which layers of material may be extruded. In some examples, bed 110 may be a heated bed which may increase adhesion of an extruded layer to bed 110. For example, the material may be a thermoplastic material formed by extrusion of a thermoplastic filament, as described below, where the thermoplastic filament may be softened and more likely to adhere to bed 110 when bed 110 is heated.

Extruder 104 may include print nozzle 108 and print head 122. Print head 122 may include a heater fluidly coupled to print nozzle 108 such that print nozzle 108 may be substantially the same temperature as the heater. Print head 122 may further include a drive gear for feeding filament 106 through the heater and print nozzle 108. In one embodiment, extruder 104 may be a direct drive extruder where the drive gear is directly coupled to the heater. In an alternate embodiment, extruder 104 may be in a Bowden configuration in which the drive gear is positioned a threshold distance away from the heater.

Filament 106 may be supplied to extruder 104 from spool 109. Filament 106 may be a thermoplastic material or thermoplastic composite. For example, filament 106 may be acrylonitrile butadiene styrene (ABS), nylon, high impact polystyrene (HIPS), or polylactic acid (PLA).

Extruder 104 may be a single head extruder (e.g., with one print nozzle 108) as described above, or in other examples, extruder 104 may be a dual head extruder, such as when the 3D printer 101 is configured for continuous filament fabrication (CFF). The dual head extruder may include two print heads, each including a nozzle, with each nozzle receiving a filament from one of two different spools. In one embodiment, the dual head extruder may be configured to receive and extrude an ABS filament through a first nozzle and may be configured to receive and extrude PLA through a second nozzle.

By applying CFF, the resulting multi-layer structure may leverage mechanical properties provided by depositing a filament that is continuous, e.g., a continuous fiber, over a base matrix forming each layer of the multi-layer structure. By bonding the continuous fiber to loading surfaces of each layer, a tensile strength of the multi-layer structure may be increased relative to a multi-layer structure that does not include the continuous filament or when chopped fibers are used instead of the continuous filament. For example, during fabrication of the multi-layer structure, a first extruder of the dual head extruder may print the base matrix using a thermoplastic filament, as described above and a second extruder may iron the continuous fiber over the recently extruded thermoplastic layer (e.g., base matrix).

The dual head extruder may also be used to print with more than one color. It will be appreciated that various printing capabilities enabled by the dual head extruder may also be provided by the single head extruder. For example, CFF and printing with more than one color may be achieved using the single head extruder but may be performed more efficiently with the dual head extruder.

The 3D printer 101 may include a controller 118 communicatively coupled to bed 110, motors 114, 112, and 116, and extruder 104. Controller 118 may actuate motors 112, 114, and 116 to move extruder 104 and bed 110 as required for layer by layer deposition of material. Further, controller 118 may actuate the heater and drive gear of extruder 104 so that filament 106 may be forced through the heater, melted, and extruded out of print nozzle 108. Instructions for actuating 3D printer components as described above may be stored in a non-volatile memory of controller 118.

As described above, a 3D printer, such as the 3D printer 101 shown schematically in FIG. 1, may be used to fabricate a 3D multi-layer structure by depositing sequential layers of a thermoplastic material. In the multi-layer structure, an intralayer mechanical strength of a thermoplastic layer may be higher than an interlayer mechanical strength, e.g., a strength of adhesion between layers. This may lead to an increased likelihood of interlayer separation. For a multi-layer structure formed via CFF, a discrepancy between intralayer and interlayer adhesion of fibers may be exacerbated by reinforcement of layers using a continuous filament. As such, multi-layer structures reinforced by the continuous filament may be particularly prone to delamination when stressed.

In one example, interlayer adhesion between layers of the multi-layer structure may be increased by printing the multi-layer structure with multi-layer filament cavities. As shown in FIGS. 2A-4, the multi-layer filament cavities may be shaped to resemble double-headed rivets, and may therefore also be referred to as double-headed rivet-shaped cavities. The multi-layer filament cavities may extend across more than one layer of the multi-layer structure, and, when filled with a filamentary material, may bond to and compress the corresponding layers, thereby forming filament-based rivets integrated into a structure of the multi-layer structure. The filamentary material of the filament-based rivets and filamentary material used to form the layers of the multi-layer structure may be of a same or different type. Whereas conventional methods for increasing interlayer adhesion may include additional processing steps to add separately fabricated rivets, a printing technique as described herein may allow the filament-based rivets to be printed directly into the multi-layer structure to provide a more efficient manufacturing process.

Printing of the filament-based rivets may be realized by using an extruder adapted with a needle nozzle, as shown in FIG. 5B and described further below. For example, at least one nozzle of the extruder may be adapted with a needle-shaped geometry for depositing the filamentary material. Sequential steps included in a process for 3D printing the multi-layer structure with the filament-based rivets are shown in FIGS. 2A-2D. An example of a multi-layer structure 600 formed via the process illustrated in FIGS. 2A-2D is shown in FIG. 6.

Turning now to FIG. 8A, a first example of a filament-based rivet 800 is illustrated. Filament-based rivet 800 has a circular profile, e.g., from a perspective along the z-axis, and is hereafter referred to as circular filament-based rivet 800. Circular filament-based rivet 800 is shown isolated, without a surrounding multi-layered structure. Circular filament-based rivet 800 may have a central axis 801 that is oriented parallel with the z-axis and has 360° (e.g., full) rotational symmetry about the central axis 801. Furthermore, circular filament-based rivet 800 may include a first head 806, a body 804, and a second head 802, with the body 804 extending between the first head 806 and the second head 802 along the central axis 801. The body 804 may have a narrower diameter than the first and second heads 806, 802, such that circular filament-based rivet 800 resembles a double-headed rivet but is not mirror symmetric across the x-y plane.

For example, the first head 806, arranged at a bottom end of circular filament-based rivet 800 along the z-axis, may have a conical shape, having a thickness (defined along the z-axis) that tapers and becomes thinner away from the central axis 801 along the x-y plane. The body 804 may be cylindrical with a uniform diameter along its height (as defined along the z-axis). The second head 802 may be shaped as a flat disc with a uniform thickness across its area. A shape of circular filament-based rivet 800 may be determined by the shape of a cavity in which it is formed, as described further below with respect to FIGS. 2A-2D. Thus, circular filament-based rivet 800 may be formed in a cavity with the geometry depicted in FIG. 8A for circular filament-based rivet 800.

A second example of a filament-based rivet 850 is illustrated in FIG. 8B, similarly shown isolated, without a surrounding multi-layered structure. Filament-based rivet 850 has a profile of a rectangle with two oppositely curved sides (from a perspective along the z-axis) and is hereafter referred to as rectangular filament-based rivet 850. A central axis 851 of rectangular filament-based rivet 850 is shown aligned parallel with the z-axis and rectangular filament-based rivet 850 may have 180° rotational symmetry about the z-axis. Rectangular filament-based rivet 850 may include a first head 856, a body 854 and a second head 852.

The body 854 may be cylindrical, similar to the body 804 of circular filament-based rivet 800, and extends between the first head 856 and the second head 852 along the central axis 851. Also similar to circular filament 800, the first head 856 may have a thickness that tapers to become thinner away from the central axis 851 along the x-y plane. The second head 852 has a uniform thickness along the x-y plane. As described above, rectangular filament-based rivet 850 may be shaped as a double-headed rivet with a geometry that corresponds to a geometry of a cavity in which rectangular filament-based rivet 850 is formed. In one example, rectangular filament-based rivet 850 may be used near an edge or rectangular arm of a multi-layered structure, where a differently shaped cavity, such as one forming circular filament-based rivet 800, may not fit. Each of the filament-based rivets shown in FIGS. 8A-8B may extend across more than one layer of a multi-layer structure, as described herein, with at least one layer compressed between the heads of the rivets. The cavities in which the rivets are formed may be strategically placed across the multi-layer structure to provide uniform reinforcement across the multi-layer structure, thereby reducing a likelihood of delamination. It will be appreciated that the filament-based rivets depicted in FIGS. 8A-8B are non-limiting examples, and other geometries have been contemplated. For example, the body of the rivet may have a similar profile (e.g., circular, rectangular, square, etc.) as the heads or may have a different profile from the heads.

Turning now to FIG. 6, the multi-layer structure 600 may be fabricated by a 3D printer such as the 3D printer 101 of FIG. 1, and may be shaped as rectangular prism. However, various other 3D shapes are possible without departing from the scope of the present disclosure. The multi-layer structure 600 may be formed of a plurality of layers 604 arranged co-planar with the x-y plane (e.g., the horizontal plane) and stacked along the z-axis. The plurality of layers 604 may be formed of a single material, such as a thermoplastic material, or more than one material, such as the thermoplastic material reinforced with a continuous fiber of a different material.

The multi-layer structure 600 may include at least one filament-based rivet 606 which may extend along the z-axis through more than one of the plurality of layers 604. In one example, when viewed along the z-axis, the filament-based rivet 606 may have a rectangular geometry. However, other geometries of the filament-based rivet 606, with respect to a perspective along the z-axis, have been considered within the scope of this disclosure, such as square, oval, circular, etc., as described above and depicted in FIGS. 8A-8B. The geometry, e.g., profile, of the filament-based rivet 606 may correspond with a shape of an opening of the nozzle which extrudes a material used to form the filament-based rivet. For example, a square filament-based rivet may be extruded using a nozzle with a square opening, a rectangular filament-based rivet may be extruded using a nozzle with a rectangular opening, a circular filament-based rivet may be extruded using a nozzle with a circular opening, etc.

Alternatively, the geometry of the filament-based rivet may be different from the shape of the opening of the nozzle and the filament-based rivet may be filled by over extrusion to completely fill the different shape. For example, the square filament-based rivet may instead be extruded using the nozzle with the circular opening. In either case, the filament-based rivet may be extruded without moving the nozzle along a horizontal plane (e.g., the x-y direction) and without creating additional layers. As described above, the filament-based rivet 606 may have a variety of rotational symmetries depending on a geometry of the filament-based rivet 606 from the perspective along the z-axis. For example, when circular, the rivet may be fully rotationally symmetric, while when square, the rivet may have a 90° rotational symmetry.

A profile of the filament-based rivet 606, e.g., a vertical profile, may vary along the z-axis which may span more than one of the plurality of layers 604 of the multi-layer structure 600. In one example, as shown in FIGS. 2A-4, the vertical profile of the filament-based rivet 606 may be substantially "T"-shaped, having wider (e.g., along the horizontal plane)

regions at a top and bottom of the rivet. Said another way, the filament-based rivet may be shaped as a double-headed rivet. Cross-sectional views of a multi-layer structure are illustrated FIGS. 2A-4, which may be taken along a line similar to line A-A' of FIG. 6, such that the multi-layer structure is sliced along the z-x plane. It will be appreciated that the filament-based rivet(s) shown in the cross-sectional views may have a similar vertical profile across the z-y plane, although small differences in relative dimensions of wider regions of the rivet versus narrower regions of the rivet may be observed.

The cross-sectional views of FIGS. 2A-2D show sequential steps in a process for reinforcing a multi-layer structure 202 with at least one filament-based rivet to increase interlayer adhesion. Multi-layer structure 202 may be printed using a 3D printer such as the 3D printer 101 shown schematically in FIG. 1. The 3D printer may include an extruder with a needle-shaped nozzle 205 which may have an elongated outlet (e.g., elongate along the z-axis). The nozzle 205 may be referred to hereafter as needle nozzle 205. Details of needle nozzle 205 are provided further below, with reference to FIG. 5B.

A first step 200 in the process for reinforcing the multi-layer structure 202 is shown in FIG. 2A. Multi-layer structure 202 may be comprised of multiple layers 218, including first bottom layer 206, second bottom layer 207, middle layers 208 and top layers 210. Multi-layer structure 202 may be printed such that a multi-layer filament cavity 216 (hereafter, cavity 216) is formed that extends through the multiple layers 218. Internal edges of the multiple layers 218 may define cavity 216 on either side of cavity 216 along the z-axis, e.g., along a height of cavity 216. Multiple layers 218 may be printed so that an infill of multi-layer structure 202, at least at top and bottom layers, may be 100%. Said another way, a volume of multi-layer structure 202 between external walls of the multi-layer structure 202 (not shown) and cavity 216 may be entirely filled by extruded material forming multi-layer structure 202. The infill of 100% may increase a resistance to delamination between layers by maximizing a contact area between layers.

In one example, middle layers 208 may be printed so that the infill is less than 100% with a perimeter of a cavity preset. In such an example, a resistance to delamination may be sacrificed to decrease a weight of multi-layer structure 202 by using less material to form middle layers 208. For example, a view 900 of multi-layer structure 202 is shown in FIG. 9, looking down the z-axis, after extruding middle layers 208 at less than 100% infill, but before extruding top layers 210. Middle layer 208 may be formed in a repeating geometric pattern, e.g., tessellated, such as triangles, as shown in FIG. 9. Other infill patterns have been considered within the scope of this disclosure, however. Cavity 216 may be surrounded by a perimeter of material 902 to contrast a compression force of the filament-based rivet and therefore, regardless of the infill percentage, may be printed with the preset perimeter of material 902 to reinforce cavity 216.

First bottom layer 206 of multiple layers 218 may be formed on base 204. Base 204 may be a bed such as bed 110 of FIG. 1 or base 204 may be a 100% infill layer of multi-layer structure 202. A gap in first bottom layer 206, e.g., a distance between internal edges of first bottom layer 206, may define a bottom width 214 of cavity 216. Second bottom layer 207 may be on top of bottom layer 206, e.g., with respect to the z-axis. Further, middle layers 208 may be arranged in face sharing contact above second bottom layer 207, such that there is not a vertical gap between each layer. In one example, a gap in second bottom layer 207 may be narrower than bottom width 214 but greater than a width 220 of a gap between middle layers 208. However, in other examples, the gap in second bottom layer 207 may instead be similar to the gap in first bottom layer 206. In one example, as shown in FIGS. 2A-2D, a width of cavity 216 may taper, e.g., decrease, from width 214 to width 220 over 3-layers of extruded material. In other examples, however, changes in width of cavity 216 may occur across more or less layers than shown in FIGS. 2A-2D. Middle layers 208 may form walls of a body of cavity 216, the body having width 220. In one example, the body of cavity 216 may span 6 successive layers along the z-axis. In other examples, however, a height of the body of cavity 216 may vary to include more or less than 6 layers of multiple layers 218.

Top layers 210 may form top of cavity 216 with a width 222. As shown in FIGS. 2A-2D, top layers 210 includes two layers but in other examples, more or less than two layers may be included in the top of cavity 216. In one example, width 222 may be greater than width 220 and substantially equal to width 214. In another example width 222 may be greater than width 220 and either greater or less than width 214. Cavity 216 may generally have an "I-shaped" profile and may have a geometry resembling a double-headed rivet. As such, cavity 216 may include a first head site and a second head site, at a top and bottom of cavity 216, respectively, and a body site extending between the head sites along the z-axis.

In the first step 200 of the process, needle nozzle 205 may be positioned inside cavity 216 so that an opening 224 of needle nozzle 205 is held just above base 204, with a space therebetween. Liquid filament 212 may fill an inner volume of needle nozzle 205 and, in one example, may be a same material as the material comprising multiple layers 218. Alternatively, as another example, liquid filament 212 may be a different thermoplastic material from the material comprising multiple layers 218. Liquid filament 212 may be filamentary material that is heated to melt, such that the filamentary material is in a heated, liquid phase, and fed into needle nozzle 205 by a print head, such as print head 122 shown in FIG. 1. Dimensions of needle nozzle 205, e.g., a length of the elongate outlet of needle nozzle 205, may be such that opening 224 may reach the base 204 of cavity 216. Furthermore, an outer diameter of needle nozzle 205 may correspond to widths of cavity 216 to allow needle nozzle 205 to be readily inserted therein.

Turning now to FIG. 2B, a second step 225 of the process is shown, where cavity 216 is partially filled with liquid filament 212. Needle nozzle 205 may be raised or base 204 may be lowered by a z-motor, such as z-motor 116 of FIG. 1, to align opening 224 of needle nozzle 205 with a top of second bottom layer 207 along the z-axis. Liquid filament 212 may be forced out of opening 224, e.g., extruded, by the print head along a direction indicated by arrows 226 to fill a bottom portion of cavity 216 between base 204 and a top of second bottom layer 207. When liquid filament 212 is expelled from or exits needle nozzle 205, liquid filament 212 may cool and solidify upon cooling to form a solid extruded component.

Figure 2D:
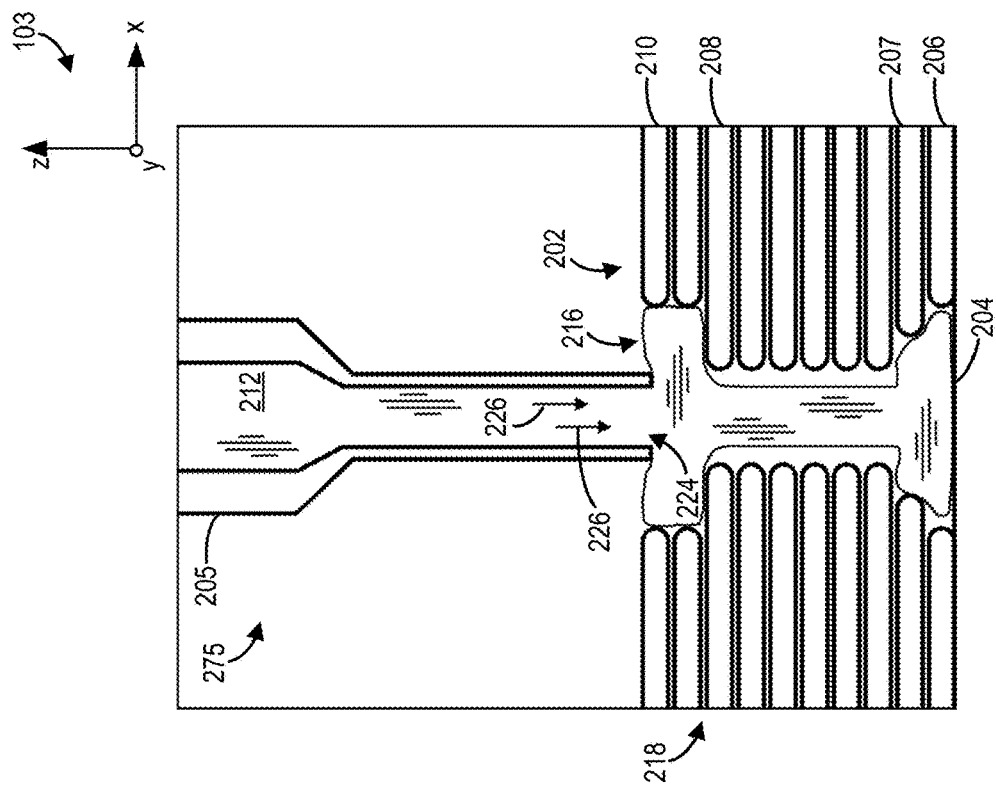
Figure 2C:
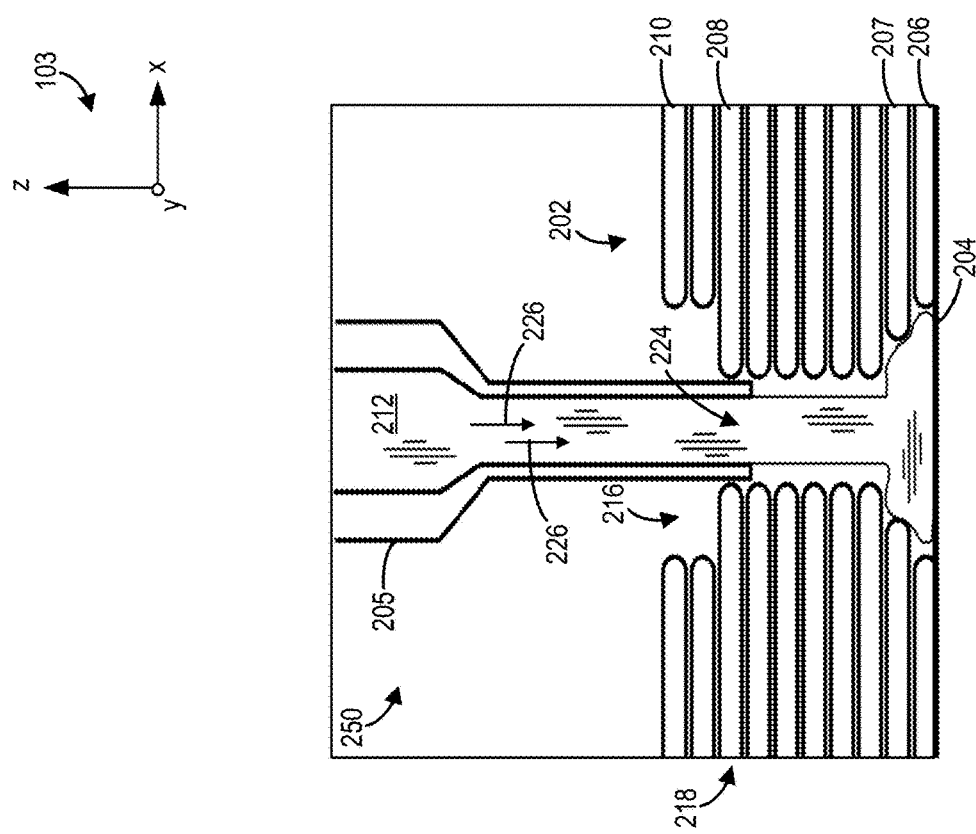

A third step 250 in the process is illustrated in FIG. 2C, where more of cavity 216 (e.g., the body) is filled with liquid filament 212. Needle nozzle 205 may be further raised or base 204 may be further lowered to align opening 224 of needle nozzle 205 with one of the middle layers 208. Liquid filament 212 may be extruded from opening 224 fill cavity 216 up to the level of opening 224. Liquid filament 212 in cavity 216 may proceed to cool, as described above. A volume of liquid filament 212 in the body of cavity 216 may be less a volume of cavity 216 due to the space filled by walls of needle nozzle during extrusion.

A fourth step 275 in the process is depicted in FIG. 2D where cavity 216 is entirely filled with liquid filament 212. Needle nozzle 205 may be raised or base 204 may be lowered by the z-motor to be aligned vertically with top layer 210. Liquid filament 212 may be extruded through opening 224 to fill a top of cavity 216, forming a continuous double-headed filament-based rivet entirely enclosed by multiple layers 218 within cavity 216. Upon cooling, liquid filament 212 is solidified in substantially a shape of cavity 216. The continuous part formed within cavity 216 may be a filament-based rivet.

Steps, 200, 225, 250, and 275 may be performed while needle nozzle 205 and/or multi-layer structure 202 move along the z-axis and are stationary in the horizontal plane. In this way, the liquid filament exiting needle nozzle 205 may flow primarily in a z-direction aligning the filament in the vertical plane as the filament-based rivet cools. In one embodiment, needle nozzle 205 may move in a circular motion in the horizontal plane (e.g., plane of multiple layers 218) when filling a second head the first head site (e.g., during step 275) to distribute filament evenly.

Turning now to FIGS. 3A-3B, a first configuration 300 of a filament-based rivet 302, formed immediately after the process depicted in FIGS. 2A-2D, is shown in FIG. 3A. In FIG. 3B, filament-based rivet 302 is shown in a second configuration 350, after a material of the rivet has cooled. Filament-based rivet 302 is formed within the multi-layer structure 202 of FIGS. 2A-2B and therefore components of the multi-layer structure 202 are labelled similarly and will not re-introduced.

The first configuration 300 of filament-based rivet 302 of FIG. 3A depicts filament-based rivet 302 with dimensions corresponding to deposition of liquid filament (e.g., liquid filament 212 of FIG. 2A) immediately after needle nozzle 205 is moved away from cavity 216. A filamentary material of filament-based rivet 302 may therefore still be warm and at least partially mobile (e.g., not fully solidified). Filament-based rivet 302 may be shaped by the inner edges of multiple layers 218 and may therefore be formed in the shape of cavity 216, as described above with respect to FIGS. 2A-2D. Filament-based rivet 302 may have a bottom width 304 and may taper to a middle width 306, upwards along the z-axis. Filament-based rivet 302 may have a first height 308, which may be a maximum height of the filament-based rivet 302 and of the corresponding cavity 216, and a body of filament-based rivet 302, e.g., a portion of filament-based rivet 302 between second bottom layer 207 and top layers 210 and located in the body site of cavity 216, may have a uniform width of middle width 306. A top width 310 of filament-based rivet 302 may be similar to bottom width 304. In another embodiment, top width 310 may be greater than middle width 306 and less than bottom width 304. In yet another embodiment, top width 310 may be greater than middle width 306 and greater than bottom width 304.

In the second configuration 350 of FIG. 3B, sufficient time has elapsed to allow filament-based rivet 302 to cool. As the filamentary material of filament-based rivet 302 cools, the material may contract. Due to an alignment of the filamentary material substantially parallel with the z-axis, filament-based rivet 302 may contract predominantly along the z-axis. For example, arrows 352 and 354 indicate directions of contraction of filament-based rivet 302 as well as compression imposed on multiple layers 218 of the multi-layer structure 202. Filament-based rivet 302 may decrease in height to a second height 358, which is less than the first height 308 of the first configuration 300 shown in FIG. 3A. The decrease in height of filament-based rivet 302 may compress middle layers 208 between top layers 210 and bottom layers 206, 207 of multi-layer structure 202. In this way, a layer detachment resistance between middle layers 208 may be increased. In turn, a detachment resistance between bottom layers 206 and 207 or between top layers 210 may be increased by staggering a placement of a plurality of filament-based rivets throughout a 3D printed multi-layer structure or component, as shown in FIG. 4

FIG. 4 shows a cross section 400 of a multi-layer structure 402, which may be similar to the multi-layer structure 600 of FIG. 6 and 202 of FIGS. 2A-2D. Cross section 400 may be taken along the z-x plane, as indicated by line A-A' shown in FIG. 6. Multi-layer structure 402 includes a plurality of filament-based rivets 404, each configured similarly to the filament-based rivet 302 of FIGS. 3A-3B and formed via the process illustrated in FIGS. 2A-2D. The plurality of filament-based rivets 404 includes a first set of filament-based rivets 404a, a second set of filament-based rivets 404b, and a third set of filament-based rivets 404c. The plurality of filament-based rivets 404 may be arranged in a three-dimensional pattern which may include locating the plurality of filament-based rivets spaced apart from one another along the x- and y-axes, across an entire area of the multi-layer structure 402, and offset from one another, e.g., staggered and at least partially overlapping with other cavities, along the z-axis.

The first set of filament-based rivets 404a may be formed to increase a layer detachment resistance between the extruded layers encompassed by bracket 406. Rivets of first set of filament-based rivets 404a may be distributed at intervals along an x-y plane of multi-layer structure 402 with the rivets 404a spaced apart from one another along both the x-axis and the y-axis. During printing of multi-layer structure 402, a new layer of multi-layer structure 402 may be printed over a previous layer and the layers may be printed with gaps to form cavities 401 in multi-layer structure 402, the cavities 401 similar to cavity 216 of FIGS. 2A-2D. For example, a first bottom layer 403 of multi-layer structure 402 may be printed with gaps forming bottom head sites of the cavities 401 of the first set of filament-based rivets 404a.

As layers are subsequently deposited, the body sites of cavities 401 of the first set of filament-based rivets 404a are formed. At a first mid-layer 405 of the body sites, the first mid-layer 405 may be printed with additional gaps that form bottom head sites of the cavities 401 of the second set of filament-based rivets 404b. Layers printed sequentially over the mid-layer 405 may continue to form the cavities 401 of both the first and second sets of filament-based rivets 404a, 404b, until a first top layer 412 is deposited. Addition of layers in the z-direction may pause after completion of first top layer 412 of multi-layer structure 402. First top layer 412 may correspond to a top head site of the cavities 401a of the first set of filament-based rivets 404a and a middle layer (e.g., body site) of the cavities 401b of the second set of filament-based rivets 404b. After printing of the first top layer 412 is complete, the first set of filament-based rivets 404a may be formed by extruding liquid filament through a needle nozzle, as described above with respect FIGS. 2A-D. At this point, the cavities 401b forming the second set of filament-based rivets 404b are not filled because the cavities 401b are only partially formed.

After forming filament-based rivets 404a, additional layers may be added on top of the first top layer 412, along the horizontal (x-y) plane of multi-layer structure 402. During printing of a second mid-layer 407, gaps for forming bottom head sites of the cavities 401c of the third set of filament-based rivets 404c may be included in the second mid-layer 407, in addition to gaps forming body sites of the cavities of the second set of filament-based rivets 404b. Upon depositing a second top layer 414 of multi-layer structure 402, horizontal extrusion may again pause. Second top layer 414 may correspond with a top head site of the cavities 401b of the second set of filament-based rivets 404b. As described above, only the cavities 401b corresponding to filament-based rivets with a completed top layer (e.g., of the second set of filament-based rivets 404b) are filled after printing of the second top layer 414 is complete. The second set of filament-based rivets 404b may be formed to increase a layer detachment resistance between extruded layers encompassed by bracket 408.

Similarly, the third set of filament-based rivets 404c may be formed after completion of a third top layer 416 and may increase a layer detachment resistance between extruded layers encompassed by bracket 410. In this way, layers of multi-layer structure 402 may be evenly compressed by the plurality of filament-based rivets 404 by distributing the rivets across multi-layer structure 402, e.g., spaced apart along the x- and y-axes and staggered while overlapping along the z-axis. It will be appreciated that multi-layer structure 402 is a non-limiting example and additional or fewer filament-based rivets may be included in other examples without departing from the scope of the present disclosure.

Figure 5A:
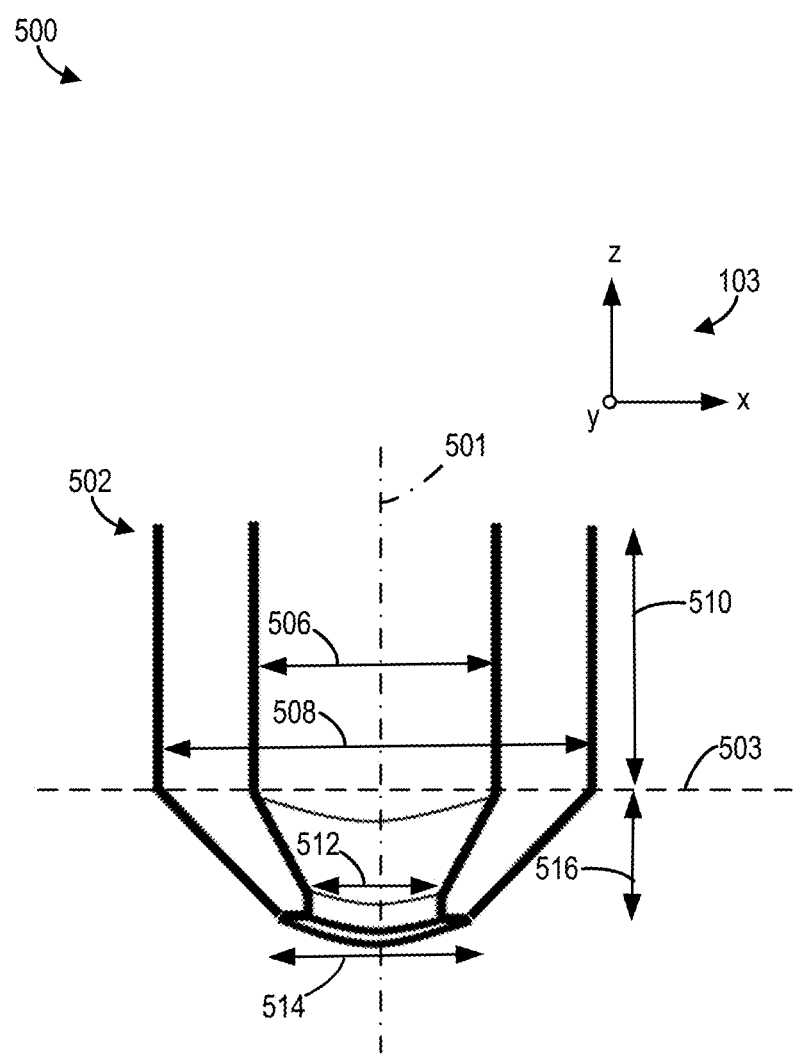
FIG. 5A shows an example of a conventional extrusion nozzle for a 3D printer.
Figure 5B:
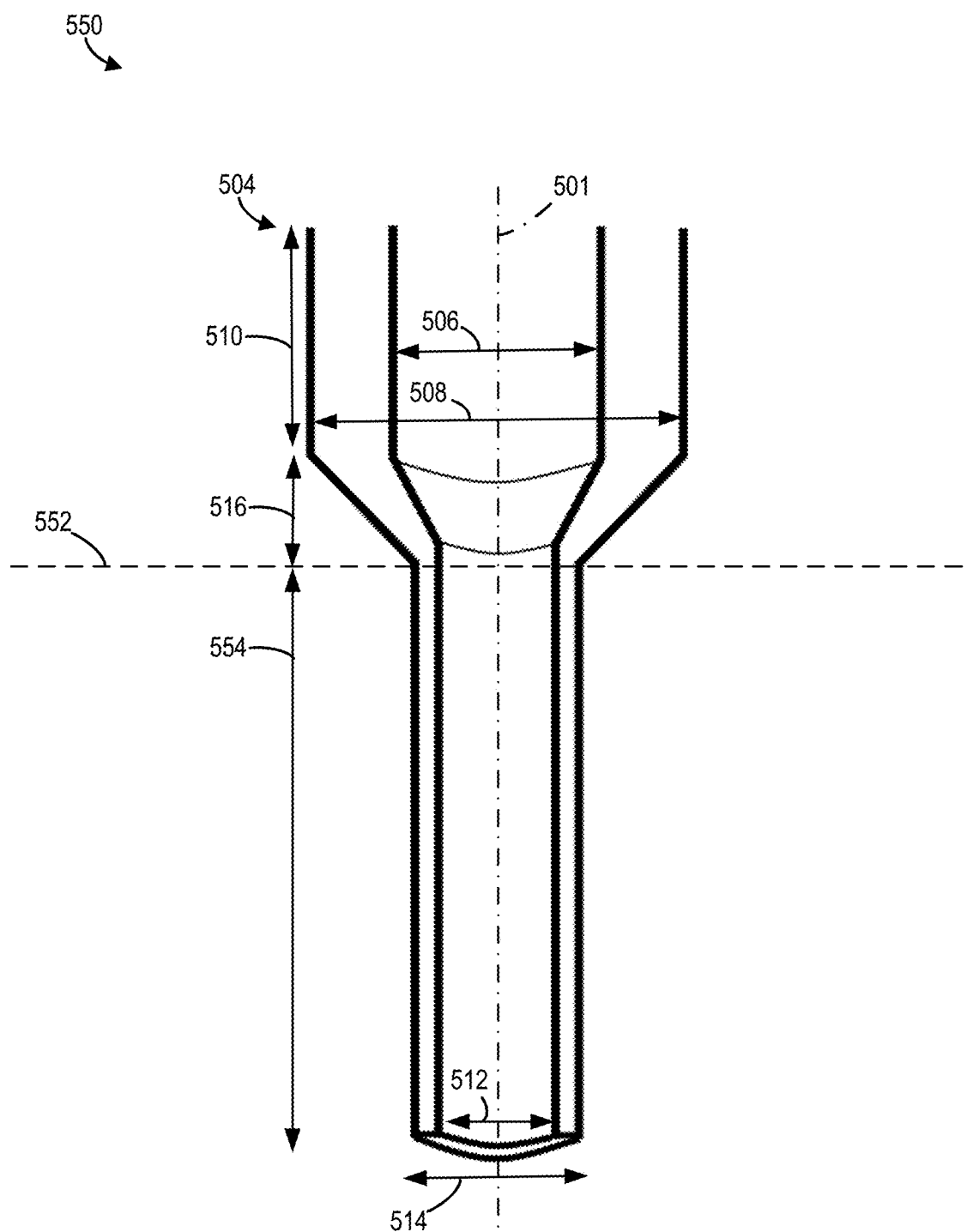
FIG. 5B shows an example of a needle extrusion nozzle for a 3D printer.

Turning now to FIGS. 5A-B, a cross section 500 of a first nozzle 502 and cross section 550 of a second nozzle 504 are shown. Cross sections 500 and 550 may be taken along the z-x plane and first nozzle 502 and second nozzles 504 may have cylindrical symmetry about a central axis 501 that is aligned with the z-axis. First and second nozzles 502 and 504 may be nozzles of a 3D printer such as 3D printer 101 of FIG. 1.

As shown in FIG. 5A, first nozzle 502 may be a conventional nozzle used for the 3D printer. First nozzle 502 may have an upper inner diameter 506 and an upper outer diameter 508 corresponding to an upper portion of first nozzle 502 that has a first height 510. Upper portion of first nozzle 502 may be a portion of first nozzle 502 extending above line 503 with respect to the z-axis, the upper portion having an upper inner diameter 506 may be substantially equal to a diameter of filament to be used with the first nozzle 502. The upper portion of first nozzle 502 may also have an upper outer diameter 508 which may be selected so that a wall of first nozzle 502 may be sufficiently thick to withstand an outward pressure of the liquid filament on walls of the nozzle during 3D printing. First nozzle 502 includes a lower portion which may have an inner diameter that tapers from the upper inner diameter 506 at a top of the lower portion to a lower inner diameter 512 at a bottom of the lower portion (where top and bottom are relative to the z-axis). An outer diameter of the lower portion of first nozzle 502 may also taper from upper outer diameter 508 at the top of the lower portion to a lower outer diameter 514 at a bottom of the lower portion. The lower portion may be a portion of first nozzle 502 extending below the line 503 and has a second height 516 which may be less than the first height 510 of the upper portion. Together the first height 510 and the second height 516 may form a total vertical height of first nozzle 502.

Turning now to FIG. 5B, second nozzle 504 may be an elongate nozzle (e.g., a needle nozzle), such as the needle nozzle 205 of FIGS. 2A-2D. An upper section of second nozzle 504, above line 552, may be similar to first nozzle 502, and may include both the upper portion and lower portion of first nozzle 502. A lower section of second nozzle 504, below line 552, may extend a third height 554 along the z-axis. In one example, the third height 554 may be equal to or greater than the total height of first nozzle 502, e.g., a sum of the first height 510 and the second height 516. The lower section of second nozzle 504 may have the lower inner diameter 512 and the lower outer diameter 514 of first nozzle 502, which may be uniform throughout the lower section of second nozzle 504.

An aspect ratio of a nozzle, such as first nozzle 502 and/or second nozzle 504, may be defined as a ratio between a length of the lower section of the nozzle (e.g., length along the z-axis) and a maximum outer diameter of the nozzle (e.g., ratio between third height 554 and lower outer diameter 514). As such, an aspect ratio of second nozzle 504 may be greater than that of first nozzle 502. In one example, the aspect ratio of second nozzle may be between 3 and 5.

As described above with respect to FIGS. 2A-D, the third height 554 of the lower section of second nozzle 504 may be similar to a desired height of a 3D printed rivet. In this way, the third height 554 and the lower outer diameter 514 of second nozzle 504 may allow second nozzle 504 to reach a bottom layer of a multi-layer filament cavity for forming the 3D printed rivet, such as cavity 216 of FIGS. 2A-2D and cavities 401 of FIG. 4.

In some configurations, an extruder of a 3D printer, such as extruder 104 of FIG. 1, may be adapted with a needle nozzle, such as second nozzle 504 of FIG. 5B. For example, the extruder may originally include a conventional nozzle, such as first nozzle 502 of FIG. 5A, which may be replaced, e.g., substituted, by the needle nozzle. As replacing the nozzle of the extruder may be included in routine maintenance and operation of the 3D printer, substitution with the needle nozzle may be readily performed. In this way, no additional mechanical modifications beyond replacement of the nozzle may be demanded to allow the 3D printer to form a 3D multi-layer structure reinforced with filament-based rivets. Instructions for including rivet shaped cavities and filling said cavities with filament to form filament-based rivets while printing the multi-layer structure may be loaded onto a controller (e.g., G-code), such as controller 118 of FIG. 1. In one example, the multi-layer structure and the filament-based rivet may be formed using the needle nozzle. In another example, the multi-layer structure may be formed using a conventional nozzle and the instructions loaded onto the controller may include pausing printing and instructing the user to manually replace the conventional nozzle with the needle nozzle before extruding the filament-based rivets.

Alternatively, the extruder may be a dual extruder including two nozzles. For example, the extruder may include both a conventional nozzle and a needle nozzle, such as first nozzle 502 and second nozzle 504, respectively, of FIGS. 5A-5B. The controller may command filament extrusion through the conventional nozzle or the needle nozzle depending on a step executed by the 3D printer according to a pre-set multi-layer structure configuration, e.g., print design. In order to allow the needle nozzle to reach a desired position on the z-axis for extruding a layer of the multi-layered structure, the needle nozzle may be removed during printing of the layers of the multi-layered structure, for which a different nozzle may be used, and the controller may include instructions for pausing the print and allowing the user to attach the needle nozzle to the extruder before extruding the filament-based rivets. In such examples, the layers of the multi-layered structure and the filament-based rivets are printed using different nozzles. Alternatively, a dual extruder may include a mechanism for retracting (e.g., raising) the needle nozzle while the layers of the multi-layered structure are formed and extending (e.g., lowering) the needle nozzle when the filament-based rivet is to be extruded.

Turning now to FIG. 7, a method 700 is shown for increasing an interlayer adhesion strength of a 3D printed multi-layer structure by incorporating filament-based rivets into the structure. Instructions for carrying out method 700 may be executed by a controller for controlling a 3D printer (such as controller 118 of FIG. 1) based on instructions stored on a memory of the controller.

The 3D printer may include an extruder with a single nozzle or may be dual head extruder configured with two nozzles. At least one of the nozzles of the 3D printer may be a needle nozzle, as described above with respect to FIG. 5B. In one example, when the extruder has the single nozzle, layers of the multi-layer structure and filament-based rivets may both be extruded by the needle nozzle. Alternatively, when the extruder has two nozzles, only filament-based rivets may be extruded by the needle nozzle and layers may be extruded by a conventional nozzle as described above with respect to FIG. 5A. In an embodiment where the extruder includes the single nozzle, the 3D printer may include one type of filament (e.g., ABS) used to form both the layers and the filament-based rivets. In the alternate embodiment where the extruder is the dual head extruder, each extruder may extrude a different filament. One type of filament may form the layers of the multi-layer structure while a different type of filament may form the filament-based rivets. The filament types may correspond to different filament materials (e.g., ABS and PLA) or different colors of the same filament material. In yet another example, the 3D printer may be configured for CFF and one filament material may be used to print a base matrix and a different filament material may be used for reinforcing the base matrix layers. The filament-based rivets may be formed using either the base matrix filament or the reinforcing filament.

At 702, layers formed of a first filament, e.g., a first filamentary material, of the multi-layer structure are extruded along a horizontal plane, each new layer stacked vertically on top of a previous layer and resulting in stacked layers. The layers may be printed including gaps which form at least one rivet-shaped multi-layer filament cavity such as cavity 216 of FIGS. 2A-2D and the cavities 401 of FIG. 4. The layers may be extruded with 100% infill. In one embodiment, multiple cavities at different stages of cavity formation may be produced according to the layer being printed due to a staggering of the cavities along a vertical axis of the multi-layer structure, as described above with respect to FIG. 4.

At 704, method 700 includes determining if the number of layers extruded is equal to a threshold number of layers. The threshold number of layers may be a pre-determined minimum number of layers for forming a cavity in which a filament-based rivet may be extruded. For example, a threshold number of layers may be more than 2. In one example, the threshold number of layers may vary depending on a total number of layers of the multi-layer structure. Extruding the threshold number layers may correspond to extruding a second head site, body, and first head site of a double-headed rivet-shaped cavity. The threshold number of layers may be extruded using the conventional nozzle or the needle nozzle.

If the number of layers does not reach the threshold number of layers, method 700 returns to 702 to continue extruding the layers of the multi-layer structure. If the number of layers equals the threshold, method 700 proceeds to 706 to align the needle nozzle with a center of the cavity for which the threshold hold number of layers have been extruded.

At 708, the needle nozzle is lowered relative to a topmost extruded layer of the multi-layer structure (e.g., moved in a negative z-direction w/respect to reference axes 103 of FIGS. 1-6) so that an opening of the needle nozzle is even with a bottom layer of the cavity for which the threshold number of layers have been extruded. The needle nozzle may be lowered by moving either a baseplate of the 3D printer or the extruder nozzle in the appropriate direction. The positioning of the needle nozzle within the cavity may be similar to the configuration shown and discussed above with respect to the first step 200 of FIG. 2A.

At 710, method 700 includes filling a bottom of the cavity, e.g., a bottom head site of the cavity, while holding the needle nozzle in a stationary position relative to the multi-layer structure. The needle nozzle may move in a circular motion in the horizontal plane as allowed by clearance between an outer diameter of the needle nozzle and a diameter of the cavity to help ensure even filling of the bottom of the cavity. In one example, the filament may be the first filament which was extruded at 702. In another example, the filament may be a second filament, e.g., a second filamentary material, formed of a different material and/or color than the first filament. Filling the bottom of the cavity at 710 may correspond to the second step 225 described above with respect to FIG. 2B.

At 712, the needle nozzle may proceed to fill a middle of the cavity, e.g., a body site of the cavity, with extruded filament while the needle nozzle is moved upwards relative to the multi-layer structure towards the top layer of the cavity. In one example, moving the needle nozzle may include actuating a z-motor to move the needle nozzle in the desired direction. In another example, moving the needle nozzle relative to the multi-layer structure may include moving a supporting the multi-layer structure downwards to move the multi-layer structure relative to the needle nozzle. Extruding of the filament to fill the middle of the cavity may be similar to the process shown above with respect to the third step 250 of FIG. 2C.

At 714, method 700 includes further slowing the movement of needle nozzle so that the top layers of the cavity are filled with extruded material. Furthermore, at 716, the needle nozzle may be optionally moved in a circular direction along the horizontal plane to evenly distribute material within the top layers of the cavity. The cavity may be filled as shown at the fourth step 275 of FIG. 2D.

At 718, method 700 includes determining if another cavity is to be filled before depositing more layers of the multi-layer structure. For example, more than one cavity may satisfy the threshold number of layers as determined at 704. If an additional cavity satisfies the threshold number of layers and has not yet been filled with filament, method 700 returns to 706 and the needle is aligned with a different cavity. As such, additional cavities may be included in the multi-layer structure. If there is not another cavity to be filled, all of the cavities meeting a threshold number of layers at a current state of the multi-layer structure have been filled with filament and method 700 proceeds to 720.

At 720, method 700 includes determining if a new layer is to be extruded. If a new layer is to be extruded, method 700 returns to 702 and additional layers may be printed along the horizontal plane and stacked over previous layers in the vertical direction. If additional layers are not demanded method 700 proceeds to 722 to adjust a status of the 3D printer to an after print state.

Instructions for the 3D printer to enter the after print state may include moving the extruder and the bed to a home position such that an operator may easily access the printed multi-layer structure for removal from the bed. Additionally, instructions may also include reducing a temperature of the bed and extruder so that filament within the extruder may solidify and the bed may cool so that the multi-layer structure may be efficiently separated from the bed.

FIGS. 1-6 and 8A-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The technical effect of the filament-based rivets may be to increase a resistance to interlayer detachment of a 3D printed multi-layered structure. The filament-based rivets, as described above, may create a compressive load between the printed layers forming the middle layers of a multi-layer filament-based cavity in which each of the filament-based rivet is positioned, thus strengthening adhesion between layers of the 3D printed multi-layered structure. The cavities and the filament-based rivets may be formed in-situ during printing using either a single extruder or a dual extruder system. The system may include at least one needle nozzle, used to at least fill the cavities to form the filament-based rivets according to instructions executed by a controller of the system. The multi-layer structure as described herein may provide an economical solution that does not demand additional processes steps to be applied to the multi-layer structure after printing. Further, the strategy described above for forming the filament-based rivets may be implemented by a routine process of exchanging extruder nozzles of a 3D printer.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The disclosure also provides support for a method for printing a three-dimensional multi-layer structure, comprising: distributing a cavity over multiple layers of a first filamentary material during deposition of the multiple layers of the first filamentary material, the cavity shaped as a double-headed rivet, and filling the cavity with a second filamentary material in a vertical direction to form a filament-based rivet, the vertical direction perpendicular to a plane of the multiple layers. In a first example of the method, distributing the cavity over the multiple layers of the first filamentary material includes printing the multiple layers of the first filamentary material to include a first head of the cavity at a bottom of the cavity, a body of the cavity above the first head, and a second head of the cavity above the body, the first head and the second head each having a width, the width perpendicular to the vertical direction, greater than the body, and wherein each of the first head, the body, and the second head span more than one of the multiple layers of the first filamentary material along the vertical direction. In a second example of the method, optionally including the first example, the method further comprises: positioning a tip of a needle-shaped nozzle in the first head of the cavity prior to filling the cavity. In a third example of the method, optionally including one or both of the first and second examples, filling the cavity with the second filamentary material further includes extruding the second filamentary material through a needle-shaped nozzle to fill the first head of the cavity and, when the first head is filled, raising the needle-shaped nozzle relative to the multiple layers along the vertical direction to fill the body of the cavity, from a bottom of the body to a top of the body of the cavity. In a fourth example of the method, optionally including one or more or each of the first through third examples, the method further comprises: after filling the first head and the body of the cavity with the second filamentary material using a needle-shaped nozzle, holding a tip of the needle-shaped nozzle aligned with a top of the second head of the cavity while filling the second head of the cavity with the second filamentary material. In a fifth example of the method, optionally including one or more or each of the first through fourth examples, filling the second head of the cavity with the second filamentary material includes moving the needle-shaped nozzle in a circular motion in the plane of the multiple layers to distribute the second filamentary material evenly in the second head of the cavity. In a sixth example of the method, optionally including one or more or each of the first through fifth examples, filling the cavity with the second filamentary material includes depositing the second filamentary material while the second filamentary material is in a heated, liquid phase, and wherein the second filamentary material cools, contracts, and solidifies after deposition in the cavity. In a seventh example of the method, optionally including one or more or each of the first through sixth examples, layers of the multiple layers of the first filamentary material located between the first head and the second head of the cavity are compressed when the second filamentary material cools and contracts, and wherein the second filamentary material contracts along the vertical direction. In a eighth example of the method, optionally including one or more or each of the first through seventh examples, the method further comprises: printing the three-dimensional multi-layer structure with additional cavities, the additional cavities configured similar to the cavity, and wherein the additional cavities are arranged spaced away from one another along the plane of the multiple layers and staggered while at least partially overlapping with one another along the vertical direction.

The disclosure also provides support for a multi-layer structure, comprising: stacked layers of a first filamentary material, the stacked layers arranged coplanar and stacked along a vertical axis, cavities formed within the stacked layers of the first filamentary material and filled with a second filamentary material, the cavities shaped as double-headed rivets and arranged in a three-dimensional pattern in the multi-layer structure, wherein each of the cavities extends across more than one layer of the stacked layers of the first filamentary material. In a first example of the system, the three-dimensional pattern of the cavities includes an arrangement of the cavities spaced apart from one another along a plane perpendicular to the vertical axis, across an entire area of the multi-layer structure, and wherein, along the vertical axis, the cavities are offset from one another and each of the cavities at least partially overlap with other cavities. In a second example of the system, optionally including the first example, the first filamentary material and the second filamentary material are each a thermoplastic material of a same or different type. In a third example of the system, optionally including one or both of the first and second examples, an infill of the stacked layers is equal to 100%. In a fourth example of the system, optionally including one or more or each of the first through third examples, the stacked layers of the first filamentary material are reinforced by a continuous filament.

The disclosure also provides support for a method for reinforcing a multi-layer structure, comprising: printing layers of a first filamentary material with double-headed rivet-shaped cavities, the double-headed rivet-shaped cavities extending across more than one of the layers, and extruding a second filamentary material into the double-headed rivet-shaped cavities from bottoms of the double-headed rivet-shaped cavities to tops of the double-headed rivet-shaped cavities using an elongate nozzle, before the double-headed rivet-shaped cavities are sealed by printing a layer of the first filamentary material over the tops of the double-headed rivet-shaped cavities, wherein the second filamentary material in the double-headed rivet-shaped cavities forms filament-based rivets that, upon cooling, contract and compress layers of the first filamentary material arranged between a first head of the filament-based rivets and a second head of the filament-based rivets. In a first example of the method, printing the layers of the first filamentary material includes printing the layers using a 3D printer with a single head extruder. In a second example of the method, optionally including the first example, printing the layers of the first filamentary material includes printing the layers using a 3D printer with a dual head extruder. In a third example of the method, optionally including one or both of the first and second examples, printing the layers of the first filamentary material includes printing the layers by extruding the first filamentary material through the elongate nozzle. In a fourth example of the method, optionally including one or more or each of the first through third examples, extruding the second filamentary material using the elongate nozzle includes extruding the second filamentary material sequentially through an upper section of the elongate nozzle and a lower section of the elongate nozzle, the upper section having a maximum outer diameter that is greater than an outer diameter of the lower section, and wherein a height of the lower section is equal to or greater than a height of the upper section of the elongate nozzle. In a fifth example of the method, optionally including one or more or each of the first through fourth examples, the height of the lower section of the elongate nozzle is at least equal to a maximum height of the double-headed rivet-shaped cavities.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for printing a three-dimensional multi-layer structure, the method comprising:
distributing a cavity over multiple layers of a first filamentary material during deposition of the multiple layers of the first filamentary material, the cavity shaped as a double-headed rivet defined by a first head of the cavity at a bottom of the cavity, a body of the cavity above the first head of the cavity, and a second head of the cavity above the body of the cavity; and
filling the cavity by a needle-shaped nozzle with a second filamentary material in a vertical direction to form a filament-based rivet, the vertical direction perpendicular to a plane of the multiple layers, and the needle-shaped nozzle being stationary when filling the first head of the cavity to form a first head of the filament-based rivet and moving in a circular motion in the plane of the multiple layers when filling the second head of the cavity to form a second head of the filament-based rivet.

2. The method of claim 1, wherein distributing the cavity over the multiple layers of the first filamentary material includes printing the multiple layers of the first filamentary material to include the first head of the cavity, the body of the cavity, and the second head of the cavity, wherein the first head of the cavity and the second head of the cavity each have a width extending perpendicular to the vertical direction, wherein the width of the first head of the cavity and the second head of the cavity is greater than a width of the body, and wherein each of the first head of the cavity, the body, and the second head of the cavity span more than one of the multiple layers of the first filamentary material along the vertical direction.

3. The method of claim 2, further comprising positioning a tip of the needle-shaped nozzle in the first head of the cavity prior to filling the cavity.

4. The method of claim 2, wherein filling the cavity with the second filamentary material further includes extruding the second filamentary material through the needle-shaped nozzle to fill the first head of the cavity and, when the first head of the cavity is filled, raising the needle-shaped nozzle relative to the multiple layers along the vertical direction to fill the body of the cavity, from a bottom of the body to a top of the body of the cavity.

5. The method of claim 2, further comprising, after filling the first head of the cavity and the body of the cavity with the second filamentary material using the needle-shaped nozzle, holding a tip of the needle-shaped nozzle aligned with a top of the second head of the cavity while filling the second head of the cavity with the second filamentary material.

6. The method of claim 5, wherein filling the second head of the cavity with the second filamentary material includes moving the needle-shaped nozzle in the circular motion in the plane of the multiple layers to distribute the second filamentary material evenly in the second head of the cavity.

7. The method of claim 2, wherein filling the cavity with the second filamentary material includes depositing the second filamentary material while the second filamentary material is in a heated, liquid phase, and wherein the second filamentary material cools, contracts, and solidifies after deposition in the cavity.

8. The method of claim 7, wherein layers of the multiple layers of the first filamentary material located between the first head of the cavity and the second head of the cavity are compressed when the second filamentary material cools and contracts, and wherein the second filamentary material contracts along the vertical direction.

9. The method of claim 1, further comprising printing the three-dimensional multi-layer structure with additional instances of the cavity, wherein the additional cavities are arranged spaced away from one another along the plane of the multiple layers and are staggered while at least partially overlapping with one another along the vertical direction.

10. A method for reinforcing a multi-layer structure, the method comprising:
    printing layers of a first filamentary material with double-headed rivet-shaped cavities, the double-headed rivet-shaped cavities each extending across more than one of the layers;
    extruding a second filamentary material into the double-headed rivet-shaped cavities from bottoms of the double-headed rivet-shaped cavities to tops of the double-headed rivet-shaped cavities using an elongate nozzle; and
    sealing the double-headed rivet-shaped cavities by printing a layer of the first filamentary material over the tops of the double-headed rivet-shaped cavities;
    wherein the second filamentary material in the double-headed rivet-shaped cavities forms filament-based rivets that cool to contract and compress layers of the first filamentary material arranged between a first head of the filament-based rivets and a second head of the filament-based rivets.

11. The method of claim 10, wherein printing the layers of the first filamentary material includes printing the layers using a 3D printer with a single head extruder.

12. The method of claim 10, wherein printing the layers of the first filamentary material includes printing the layers using a 3D printer with a dual head extruder.

13. The method of claim 10, wherein printing the layers of the first filamentary material includes printing the layers by extruding the first filamentary material through the elongate nozzle.

14. The method of claim 10, wherein extruding the second filamentary material using the elongate nozzle includes extruding the second filamentary material sequentially through an upper section of the elongate nozzle and a lower section of the elongate nozzle, the upper section having a maximum outer diameter that is greater than an outer diameter of the lower section, and wherein a height of the lower section is equal to or greater than a height of the upper section of the elongate nozzle.

15. The method of claim 14, wherein the height of the lower section of the elongate nozzle is at least equal to a maximum height of the double-headed rivet-shaped cavities.

\* \* \* \* \*